(12) United States Patent
Magnussen et al.

(10) Patent No.: US 6,529,122 B1
(45) Date of Patent: Mar. 4, 2003

(54) TACTILE SENSOR APPARATUS AND METHODS

(75) Inventors: Bjoern Magnussen, Albany, CA (US); Cyril Valfort, Bussy-Albieux (FR); Andrew Dahley, San Francisco, CA (US); Victor Su, Berkeley, CA (US)

(73) Assignees: Siemens Technology-to-Business Center, LLC, Berkeley, CA (US); Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/504,207

(22) Filed: Feb. 15, 2000

(30) Foreign Application Priority Data

Dec. 10, 1999 (DE) .......................... 199 59 703

(51) Int. Cl.$^7$ .............................. H04B 3/36
(52) U.S. Cl. ................. 340/407.2; 340/407.1; 200/511; 200/512; 338/99; 341/22
(58) Field of Search .................. 340/407.2, 407.1, 340/665; 338/99, 114, 112, 113; 178/18.01, 18.03, 18.04; 250/227.21; 200/512, 513, 514, 511, 5 A, 51 D; 341/22; 73/726, 862.68

(56) References Cited

U.S. PATENT DOCUMENTS

| | | | |
|---|---|---|---|
| 3,959,585 A | 5/1976 | Mattes et al. | 178/18.05 |
| 4,322,983 A | 4/1982 | Sado | 73/862.68 |
| 4,455,450 A | 6/1984 | Margolin | 178/18.03 |
| 4,469,740 A | * 9/1984 | Bailly | 428/212 |
| 4,484,026 A | 11/1984 | Thornburg | 338/320 |
| 4,492,949 A | 1/1985 | Peterson et al. | 338/114 |
| 4,517,546 A | 5/1985 | Kakuhashi et al. | 178/18.05 |
| 4,575,580 A | 3/1986 | Jandrell | 178/18 |
| 4,680,430 A | 7/1987 | Yoshikawa et al. | 345/173 |
| 4,687,885 A | 8/1987 | Talmage, Jr. et al. | 178/18 |
| 4,826,552 A | 5/1989 | Breitscheidel et al. | 156/221 |
| 5,060,527 A | * 10/1991 | Burgess | 73/862.68 |

(List continued on next page.)

FOREIGN PATENT DOCUMENTS

| | | |
|---|---|---|
| DE | 19642615 A1 | 4/1997 |
| DE | 19647876 A1 | 4/1997 |
| GB | 0720602 | 12/1954 |
| GB | 2222258 A | 2/1990 |
| GB | 2350431 A | 11/2000 |
| JP | S55-32542 | 3/1980 |
| JP | 56004885 | 1/1981 |
| JP | 58017331 | 1/1983 |
| JP | 61195324 | 8/1986 |
| WO | WO 00/72239 A1 | 11/2000 |
| WO | WO 00/72240 A1 | 11/2000 |

OTHER PUBLICATIONS

Stifelman, Lisa J., "Augmenting Real–World Objects: A Paper–Based Audio Notebook", *CHI*, 1996.
"Micro Touch Ibid Technical Summary", *Business & Professional Series*, Nov. 14, 1996.
Advertisement: See Mimio, *Virtual Ink*, 1999.
Ishii, Hiroshi, et al., "Tangible Bits: Towards Seamless Interfaces between People Bits and Atoms", *CHI*, Mar. 22–27 1997, p. 1–8.
"Conductive Foam", *Zotefoams plc*, May 1996, p. 1–6.
Prof. Heinz Wellhausen, Tastsensor mit Fingerspitzengefüuhl, 2087 Elektronik 40 (1991) May 14 Munich Germany (with English translations).
"Material Safety Data Sheet—MSDS–15 EV CN Grades", Zotefoams plc, May 2, 1997.

*Primary Examiner*—Benjamin C. Lee

(57) ABSTRACT

The tactile sensor has at least two conductive workpieces which bear on one another at a bearing area, at least one workpiece of which is produced from elastomer, with the result that it is possible to measure a contact resistance between the workpieces, which contact resistance is dependent at least on a pressure on the bearing area. At least one of the conductive workpieces comprises a conductive closed cell foam.

14 Claims, 10 Drawing Sheets

U.S. PATENT DOCUMENTS

| | | | |
|---|---|---|---|
| 5,274,362 A | 12/1993 | Potvin | 345/763 |
| 5,311,779 A | 5/1994 | Teruo | 73/726 |
| 5,365,461 A | 11/1994 | Stein et al. | 345/178 |
| 5,510,812 A | 4/1996 | O'Mara et al. | 338/114 |
| 5,565,968 A | 10/1996 | Sawa et al. | 355/259 |
| 5,790,114 A | 8/1998 | Geaghan et al. | 700/288 |
| 5,808,540 A | 9/1998 | Wheeler et al. | 338/114 |
| 5,838,309 A | 11/1998 | Robsky et al. | 345/174 |
| 5,886,615 A | 3/1999 | Burgess | 345/161 |
| 5,977,867 A * | 11/1999 | Blouin | 340/407.2 |
| 5,995,083 A | 11/1999 | Sato et al. | 345/173 |
| 6,005,496 A * | 12/1999 | Hargreaves et al. | 341/22 |
| 6,009,240 A | 12/1999 | Eguchi et al. | 358/1.16 |
| 6,072,130 A * | 6/2000 | Burgess | 200/86 R |
| 6,114,645 A * | 9/2000 | Burgess | 200/512 |
| 6,121,870 A | 9/2000 | Ariga et al. | 338/114 |

\* cited by examiner

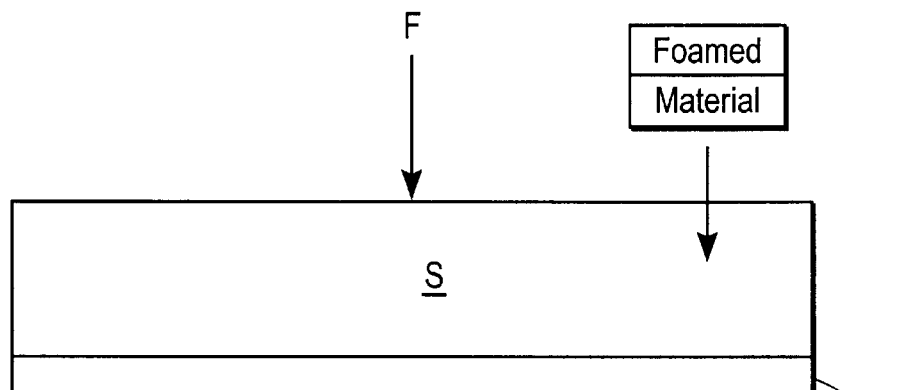
FIG. 5a
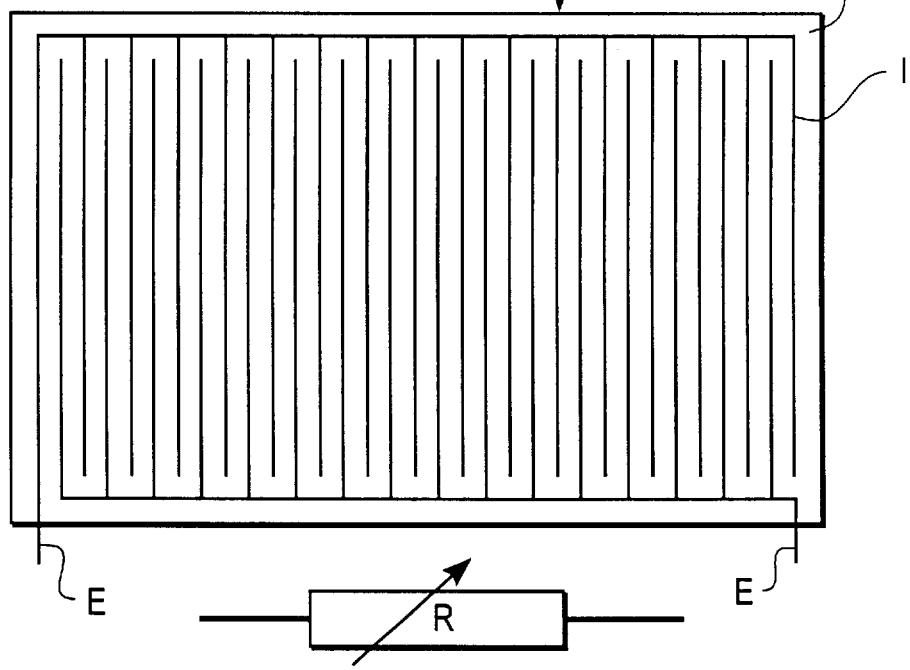
FIG. 5b
FIG. 5c

TACTILE SENSOR APPARATUS AND METHODS

CROSS-REFERENCE TO RELATED APPLICATIONS

The present application claims priority from German patent application no. 19959703.0, entitled "Taktilsensor" (translation is "Tactile Sensor") listing inventors Bjoern Magnussen and Cyril Valfort, and filed on Dec. 10, 1999.

BACKGROUND OF THE INVENTION

The present invention relates to tactile sensor apparatus and methods for operating them. The basic principle of a tactile sensor, also called a touch sensor, is to measure a contact between an object and a touch area, which is the sensory surface of the tactile sensor. In contrast to an industrial pressure or force sensor, a sensor signal which is directly proportional to the applied force is not required. Rather, the emphasis is generally on cost-effective coverage of a large or oddly-shaped area.

Primarily four approaches for implementing a large-area tactile sensor have been disclosed to date. In one approach, the touch area corresponds to a fixed plate suspended movably at a number of points, with the result that switching contacts are actuated in the event of force being applied. Neither an intensity nor a location of the pressure can be measured, and if the touch area is large it is not possible to achieve a high degree of sensitivity for the sensor. In another approach, the touch area is covered with an elastic and air-permeable material situated in an airtight sleeve, and air pressure sensors are fitted within the airtight sleeve. This approach does not allow spatial resolution of the force loading. In yet another approach, a pressure-sensitive membrane is stretched across the touch area according to a capacitive or piezoelectric principle. With this approach, it is generally possible only to detect a change in the force loading. According to still another approach, in a membrane-type pressure sensor, a conductive plastic material is applied to an interdigital structure, with an increasing pressure on the touch area resulting in a decreasing resistance between the two electrode combs. It is also possible to use further layers, for example for coverage and insulation. A membrane-type pressure sensor is comparatively costly to produce.

A still further example of a prior approach is found in a catalog from MicroTouch Systems describing a writing panel which operates according to the resistive sensor principle. To that end, a thin lower polyester layer is fixed on a rigid support, and a thin upper polyester layer is clamped above it. The upper polyester layer is under a tensile stress and is separated from the lower polyester layer by a gap. The mutually opposite surfaces of the two polyester layers are coated with a conductive material. In the event of pressure loading on the upper polyester layer, the latter is pressed onto the lower polyester layer and an electrical contact is closed, the position of which can be determined.

An object of the present invention is to provide a versatile and cost-effective tactile sensor having a simple structure. This object is achieved by means of a tactile sensor and by means of methods for operating it, in accordance with specific embodiments of the present invention.

According to a specific embodiment, the tactile sensor has at least two conductive workpieces which lie one on top of the other at a common bearing area. The workpieces are thus in mechanical contact with one another at the bearing area. Of the at least two conductive workpieces, at least one workpiece is composed of conductive elastomer material (called an elastomer piece). The elastomer piece is both elastic and conductive. In the event of loading of a force F on the elastomer piece, with the result that the latter is pressed against the other workpiece, there is a change in the contact resistance or the surface transition conductance at that part (called the contact area) of the bearing area that is exposed to pressure. The contact resistance is generally dependent on the contact area and on the applied pressure, while the electric conductance in the internal volume of the elastomer piece is only slightly dependent on the mechanical load. Typically, as the contact resistance decreases, the larger the contact area is and the greater the pressure is.

In contrast to the membrane-type pressure sensor, the tactile sensor of the present invention requires just one, additionally extended, bearing area between two workpieces. Unlike the sensor from MicroTouch, the workpiece of the present invention does not have to be mechanically clamped. According to the present invention, the mechanical bearing of the workpieces means that there is also no need to perform complicated setting of a distance. Moreover, unlike the membrane-type pressure sensor and the sensor from MicroTouch, the bearing area of the present tactile sensor is not restricted to a planar form. Furthermore, the need to structure the bearing area is obviated in the case of the tactile sensor. The workpieces and the bearing area may also have cutouts. It is sufficient if one of the workpieces is produced from elastomer material, for some embodiments. The other material may be made for example of metal, e.g., a metal sheet or a foil. However, such an arrangement affords a limited spatial resolution and flexibility.

With the present invention, an application of force can be measured for example by means of measuring a current flow through the contact area or a resistance value that takes account of the contact resistance. To that end, the workpieces may, for example, be equipped with electrodes. A voltage loading and/or measurement of a contact resistance can be done for example by means of electrodes connected to the workpieces, e.g., electrodes incorporated in the elastomer, or by other means for electrical contact with the workpieces. The means for electrical contact is referred to below as electrode, in a manner that does not constitute a restriction. A sum of resistances is measured, inter alia a transition resistance from the electrode to the workpiece a series resistance along or through the workpiece, and a contact resistance between one workpiece and the other. The composition of the resistance values for a given contact situation is known for every mechanical arrangement, with the result that the contact resistance sought can be calculated. In addition to information about an intensity of the external force given suitable circuitry, it is also possible to determine the position of the contact area and its size.

Further details as well as features and advantages of specific embodiments of the present invention are described below in conjunction with the following drawings.

BRIEF DESCRIPTION OF THE DRAWINGS

FIGS. 5a–5c show a tactile sensor of a specific embodiment of the invention having a conventional interdigital structure I.

DETAILED DESCRIPTION OF SPECIFIC EMBODIMENTS

Figure 1:
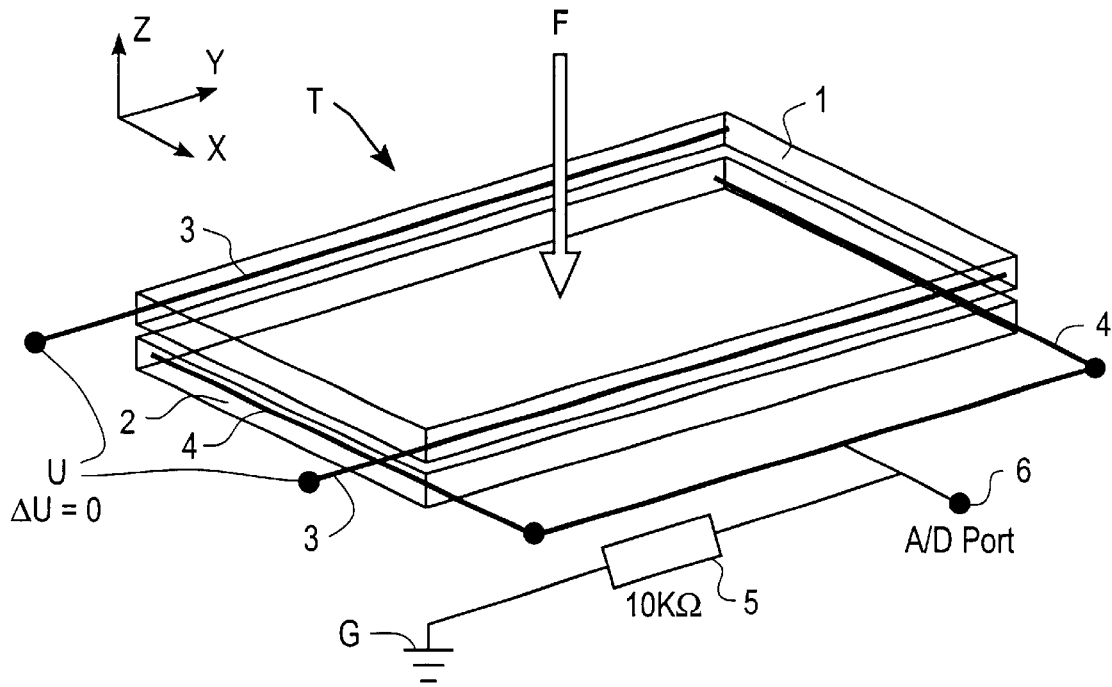
FIG. 1 shows a tactile sensor T, in accordance with a specific embodiment of the present invention.

As will be described below, the tactile sensor of the present invention has the advantage that it is constructed in a very simple manner and can thus be produced cost-effectively. Moreover, it is durable, impact-resistant and readily deformable. It is advantageous if at least two workpieces lying one on top of the other are composed of elastomer material, because, in this way, a comparatively low force loading leads to a readily measurable change in the contact resistance. This allows good sensitivity and spatial resolution of the sensor signal. Moreover, such a sensor is flexible, light and inexpensive.

According to specific embodiments of the present invention, a tactile sensor is preferred in which the elastomer material is a foam, in particular a closed-cell and conductive foam, in particular EVAZOTE® foam belonging to the ZOATEFOAMS product family. One advantage of a tactile sensor constructed from a foam, in particular Evazote foam, is that its surface affords impact protection. As a result, by way of example, persons who collide with the tactile surface already impart a large part of the impact energy to the soft sensor material. Injuries are therefore less severe. In the event that a collision frequently occurs at a highly oblique angle of impact, it is possible to fix two foam parallelepipeds for example using a number of hot-melt adhesive points at a distance of a few centimeters. Although this reduces the sensitivity of the sensor, it does not represent a limitation in the case of a relatively large tactile area, as can be used e.g., for detecting persons.

The Evazote foam material also has other advantages. For example, Evazote foam is inert and light, and also has greater stiffness and tearing strength than the known polyurethane foams that are often used. Further, this foam absorbs energy to a high degree, and its temperature, chemical and water resistance are also favorable. Well known methods can be used to fabricate it, and it can also be easily thermoformed. Metals are not corroded by Evazote foam, and the foam exhibits high ultraviolet (UV) stability. Moreover, Evazote foam has a low electrical internal resistance of approximately 100 Ω/cm. The surface resistance, on the other hand, is very high in the pressure-free state, corresponding to a high impedance. In the event of pressure loading, it may be reduced to down to a few kilo-ohms. Consequently, Evazote foam does not have to be coated in a costly manner.

The elastomer material, for example Evazote foam, is often available in the form of plates of different thickness. In order to provide a simplified description and evaluation, it is advantageous if at least the elastomer pieces are present in a uniform form, in particular as parallelepipeds. However, further geometries are also possible, e.g., half shell-shaped, triangular or box-shaped. Perforated workpieces can also be used, for example having cutouts or slots. The thickness of the material and the size of the bearing area of a tactile sensor have an influence on the measurement accuracy and the signal sensitivity. The response characteristic can be adjusted by way of the dimensioning of the elastomer pieces and the type of electrical circuitry in a manner adapted within wide limits.

In some embodiments where it is desired to set a lower detection threshold, it is advantageous if an intermediate layer is introduced between two workpieces, e.g., an electrically insulating, perforated layer for keeping a distance between the two workpieces.

It is advantageous in some embodiments if each elastomer piece has at least one electrode which is pressed onto the respective elastomer piece. The contact pressure minimizes an interfering transition resistance between electrode and elastomer piece. The contact pressure can be applied externally, e.g., by clips, screws and clamps, or internally by the electrodes being inserted into the elastomer piece and fixed, e.g., welded or bonded, under pressure.

In order to provide simplified evaluation and uniform application of a voltage field, it is advantageous if, for example on each parallelepipedal workpiece, electrodes are fitted parallel to the bearing area, in particular over the entire length of the side areas ("edge electrodes"). In this case, the electrodes of the two parallelepipeds can be arranged either parallel to one another or in such a way that each pair of electrodes is offset by an angle relative to one another, in particular by 90° between the first pair of electrodes and the second pair of electrodes. If, by way of example, the base area of a parallelepipedal workpiece lies in the (x, y) plane and the base area comprises the bearing area, then the side area is provided by one of the surfaces with a z-component, for example in the (x, z) plane or the (y, z) plane. In this case, that area of the workpiece, which is opposite to the bearing area, could be used as the touch area.

Generally, any conductive material which does not corrode is suitable as the material for the electrodes, in particular for use as edge electrodes. It is advantageous, however, if the electrode material is flexible in the active, i.e. deformable, region of the tactile sensor. Spirally wound wires, for example, are preferred in this region because they endure deformation without any problems and also tolerate a length change within wide limits, without an excessively high tensile force occurring. A wire mesh is particularly well suited, this usually being used as a contact material on radiofrequency-proof doors. Said wire mesh exhibits elasticity with regard to pressure transversely with respect to its diameter and along the wire. Also conceivable are plastics that have been rendered conductive (rubber cords, etc.), in the case of which, however, an additionally occurring electrical resistance generally has to be taken into account.

The application of the edge electrodes should be performed carefully, in order to keep the transition resistance with respect to the elastomer material as small as possible. To apply it, the electrode is preferably pressed against the elastomer material, a transition resistance thereby being minimized. For rapid and favorable incorporation, an apparatus is preferred which can be moved along the side area of the elastomer parallelepiped. It has a guide, so that it slides accurately over the edge of the elastomer. A blade sits in the center of this guide and cuts open the foam to a depth of a few millimeters. The respective electrode is inserted into the slot that has been produced in this way. For this purpose, a guide from which the electrode material emerges is fitted behind the blade. The effect of the guide, for example a small tube, is that the electrode can be inserted to a maximum extent into the slot. Behind the guide, the lateral guide of the tool narrows, thereby producing a lateral pressure which is necessary in order to achieve a low transition resistance between electrode and elastomer material. A welding unit is also situated in the region of the constriction. It may comprise for example an infrared radiator or a hot roller and welds the slot introduced by the blade. The constriction of the lateral guide is designed to be long enough that it maintains the constriction even during significant cooling of the elastomer material. The elastomer material, which is welded under a pressure, effects a continuous pressure on the electrode material and, consequently, a constant and low transition resistance.

The position and form of the electrodes are not restricted. For example, two point electrodes in opposite corners of each workpiece are possible. However, it is expedient for at least two electrodes to be fitted to each workpiece on opposite sides, in particular along the side areas laterally adjoining the bearing area.

With some embodiments, it may be expedient to connect a plurality of electrodes and thereby obtain electrical combination of the resistance values. In particular, it is favorable if the tactile sensor is designed in such a way that the transition resistance is very much smaller than the series resistance, which should in turn be very much smaller than the contact resistance Rs. For resistance measurement, it is expedient, but does not constitute a restriction, to use the following two methods. (1) Either a known or measurable voltage is applied to the electrodes, and the current flow is measured directly or indirectly, e.g., from a voltage drop across a resistor. As an alternative, a defined current flow may be prescribed, and the voltage may be measured directly or indirectly. (2) A voltage divider is formed from the resistance to be determined and a measurable resistance, with the result that the resistance can be determined from the voltage ratio. In this case, the comparison resistance may also be formed by part of the workpiece itself.

For the operation of the tactile sensor, it is advantageous if the first workpiece and the second workpiece are connected to different voltages. By way of example, in order to measure the intensity of the tactile contact, it is advantageous if both workpieces have an opposite pair of electrodes, and if an operating voltage is applied to the electrode pair of the first workpiece, and the electrode pair of the other workpiece is connected to ground. It is also possible for one pair of electrodes to be connected to a positive operating voltage and the other pair of electrodes to a negative operating voltage.

With the tactile sensor, it may also be advantageous if a voltage difference can be applied at least to the first workpiece, and the second workpiece is connected to an A/D port. By way of example, for measuring the position of the contact area, it is advantageous if a voltage difference is applied to an elastomer piece, in particular a foam parallelepiped. As a result, the elastomer piece acts as a voltage divider, resulting in the advantage of a simple structure and the possibility of determining the position of the applied force in at least one direction.

For position determination, it is also possible for one electrode of a pair of electrodes of one elastomer piece to be connected to a voltage, while the other electrode of this pair of electrodes is not connected; at the same time, the pair of electrodes of the other elastomer piece is connected up in the same way as for the measurement of the intensity of the contact resistance, e.g., to ground via a resistor and an A/D converter. After the total resistance has been measured, the way in which the electrodes of said one elastomer piece are connected up is interchanged, and a measurement is made again. The two measured values of the total resistance are compared, that electrode which has the lower resistance value being nearer the contact location. A similar connection changeover can also be carried out for the respective other elastomer piece. If, by way of example, two elastomer pieces are used whose electrode pairs are rotated through 90°, then it is possible to achieve a resolution in the x- and y-direction of the force application.

In order to measure the extent of the external pressure loading, it is advantageous if the current is measured in the case of a voltage difference within an elastomer piece, for example in addition to the position of the pressure loading (see above). In this case, the current through the elastomer piece across which the voltage is present rises as the applied force rises, because its resistance between the electrodes decreases as a result of the other elastomer piece being connected in parallel to a greater extent. This current change is measured, for example by measuring voltage across a resistor. In this method, it is necessary that the at least one electrode of the other elastomer piece not be connected, but it may be more favorable in terms of circuitry to connect it, for example to an analog-to-digital converter input having a high impedance.

Typical measurement ranges of a tactile sensor made of two foam parallelepipeds made of Evazote foam are in the range of from 0.04 N (identification limit) to 5 N (saturation limit) and, e.g., in a different case, from 0.5 N (identification limit) to 50 N (saturation limit). A combined measurement range can be achieved for example by combining the two tactile sensors, for example by placing them one above the other. A tactile sensor with the size (0.75 m×1 m) has a typical measurement accuracy of better than about ±1% in the case of position determination, with the accuracy capable of being improved by filtering and noise reduction.

Combined circuit arrangements can also be used. Generally, there exists in the simplest case approximately a point contact whose resistance decreases in the event of pressure loading. If, in the event of a pressure loading, additional contact points occur or the contact area is enlarged, then an average value of the contact resistance Rs is formed, which represents the centroid of the whole contact. In this case, not only the area centroid but also the pressure at the individual contact points or the finite contact areas influences the result. Thus, it is possible to make a statement about the position of the contact area, in particular in the case of parallelepipedal workpieces, in particular made of foam. Due to the different averaging algorithms of the mentioned position measuring methods and variations thereof, as will be discussed below, it is possible to derive further information about the contact shape from the combination of these measurements.

An electronic circuit is preferred for evaluating the sensor data. Said electronic circuit can be constructed very small and, in particular, be incorporated in the elastomer material of the sensor. Driving of the electrodes, for example voltage loading, is possible by means of a microcontroller. The evaluation of the sensor data, for example the measurement of the position of the force loading and of the shunt resistance in one or more directions, can likewise be performed by means of a microcontroller. Moreover, the microcontroller can be used to connect a current measurement via the contact resistance Rs via a resistor.

The tactile sensor can generally be used to determine touch information according to various specific embodiments, as will be further described below. However, to provide a more detailed description of the function and operation of the present invention, a specific embodiment having a tactile sensor using two parallelepipedal foam plates is described in more detail herein. In accordance with this specific embodiment, FIG. 1 shows a tactile sensor T in an oblique view. The tactile sensor comprises a first workpiece 1 and a second workpiece 2, each in the form of a parallelepipedal foam plate made of Evazote material. In order to provide a better illustration, the two plates 1, 2 are not touching one another in this figure, but in a real tactile sensor T said plates bear on one another at a bearing area.

As seen in the specific embodiment shown in FIG. 1, on two mutually opposite side areas (in the (y, z) plane) perpendicularly adjoining the bearing area (in the (x, y) plane), an electrode 3 is in each case fitted parallel to the bearing area over the entire length of the respective side area. In an analogous manner, a pair of electrodes 4 is fitted in a parallel fashion on side areas (in the (z, x) plane) of the second foam plate 2. This pair of electrodes 4 is rotated through 90° about the z-axis with respect to the other pair of electrodes 3.

The touch area that can have a force F applied to it corresponds to that side of the first foam plate 1 which is remote from the bearing area. The electrodes 3 of the first foam plate 1 are both at a voltage U of 5 V. The electrodes 4 of the second foam plate 2 are both connected via a resistor 5 of R=10 KΩ to ground G. Moreover, an analog/digital port 6 is connected to the electrodes 4 and, in turn, may be connected to an A/D converter input. As a result of the potential difference between the foam plates 1, 2, a current flows through the bearing area. The current may, e.g., via the A/ID converter, for example be connected to a microcontroller, or be measured by means of a voltage measuring device at the resistor 5.

Since the internal resistance of the foam plates 1, 2 and the transition resistance between the electrodes 3, 4 and the foam plates 1, 2 is largely independent of a deformation of the touch area, the current intensity is primarily determined by the contact resistance between the foam plates 1, 2. In the event of loading of the external force F, the two foam plates 1, 2 are pressed against one another and the contact resistance Rs is thus changed, as a rule decreased. As a result, the current flow increases, so that a contact can be identified.

Figure 2:
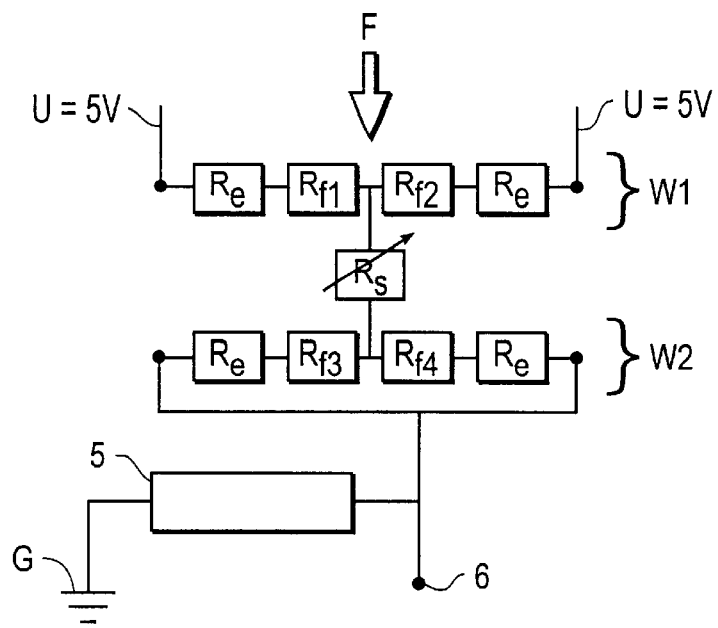
FIG. 2 shows a simplified equivalent circuit diagram of the tactile sensor T from FIG. 1.

FIG. 2 shows a simplifying equivalent circuit diagram of the tactile sensor T from FIG. 1. A chain W1 of resistances is at an operating voltage U=5 V. It has two resistances Re, which are as small as possible, analogous to the transition resistance between the electrodes 3 and the foam plate 1. Connected in between are internal resistances Rf1 and Rf2, which represent the internal resistance of the foam plate 1 acting as a voltage divider. Another chain W2 of resistances with an analogous structure (Re/Rf3/Rf4/Re) is connected in series via the external resistor 5, where R=10 KΩ, to ground G and directly to the A/D output 6. The two chains W1, W2 of resistances are connected to one another via a resistance Rs, which corresponds to the contact resistance. The resistance Rs is dependent on the applied force.

For simplification purposes, this equivalent circuit diagram represents the case of just a point contact. Rs is the largest resistance, so that the total resistance of the circuit arrangement is determined principally by Rs. The internal resistances Rf1, . . . ,Rf4 result in a measurement error which can be compensated for if the contact location is known.

In order to measure the contact resistance Rs, it is sufficient to use just one electrode 3, 4 per foam plate 1, 2 or chain W1, W2 of resistances. It is then expedient to fit the electrodes 3, 4 on opposite sides, because any position dependence of the arrangement is thus canceled out.

Figure 3:
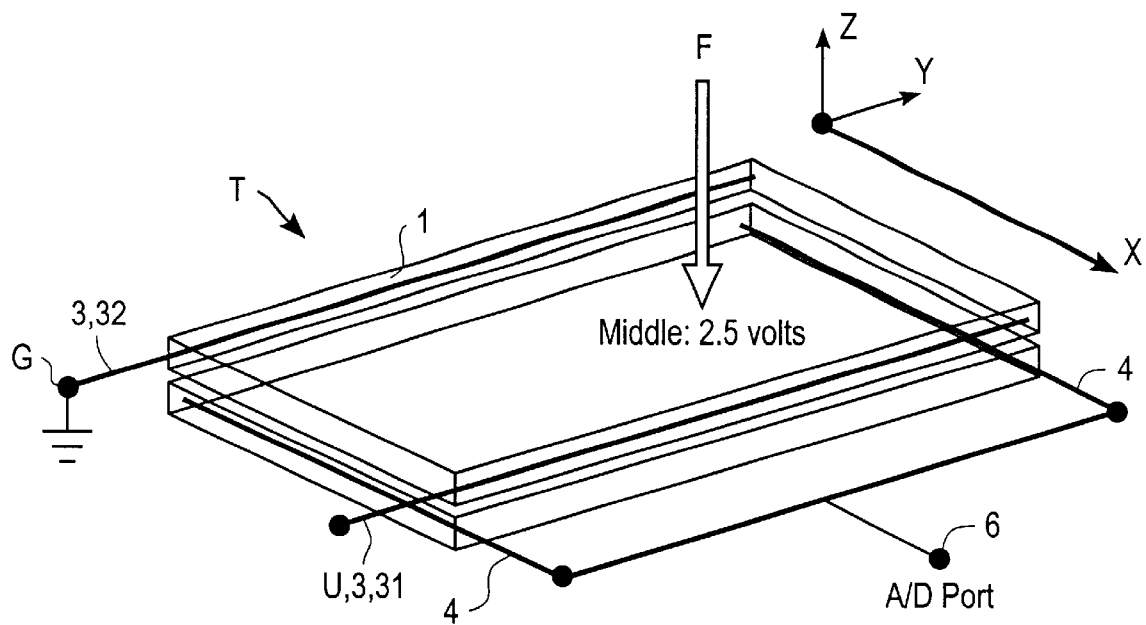
FIG. 3 shows a further tactile sensor T, in accordance with another specific embodiment of the present invention.

In accordance with another specific embodiment, FIG. 3 shows a tactile sensor T whose circuitry for determining the position of the force loading differs from that for FIG. 1. The electrodes 3, 31, 32 of the first foam plate 1 are now connected up to two different operating voltages, namely to U=5 V at a first electrode 31 and, by connection to a ground G, to U=0 V at a second electrode 32. This results in a voltage drop AU of 5 V within the first foam plate 1 in the x-direction, which causes a corresponding current flow in the material.

In the event of force loading on the touch area, the contact resistance between the two foam plates 1, 2 is reduced. The second foam plate 2 assumes the potential of the first foam plate 1 at the contact point. If a plurality of contact points and/or a larger contact area occur, then an average value of the contact resistance is formed, which represents the centroid of the whole contact. In this case, not only the area centroid but also the pressure at the individual contact points influences the result.

Alternative position determination is realized by just one of the two electrodes 31, 32 of the pair of electrodes 3 being connected to a voltage. The other pair of electrodes 4 is then connected as in FIG. 1. After the total resistance has been measured, the way in which the electrodes 31, 32 of said one pair of electrodes 3 are connected up is interchanged, and the total resistance is measured again. The two measured values of the total resistance are compared, that electrode 31 or 32 which has the smaller resistance value being closer to the contact location. However, this method has a higher degree of inaccuracy in the position determination than that described above.

By means of the circuit arrangement illustrated in FIG. 3, it is also possible to ascertain the size of the region having intensified contact, the contact size. It goes without saying that the way in which the two foam plates 1, 2 are connected up can also be interchanged with respect to one another.

Figure 4:
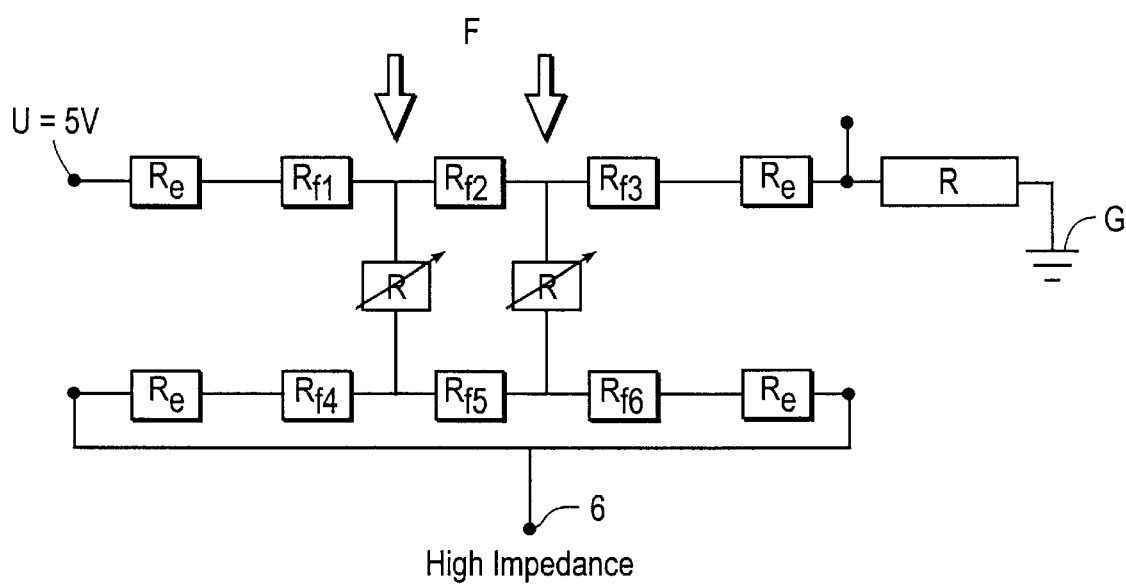
FIG. 4 shows a simplified equivalent circuit diagram of the tactile sensor T from FIG. 3.

FIG. 4 shows a simplifying equivalent circuit diagram of the tactile sensor T from FIG. 3 with two contact points represented by the two pressure-dependent resistances Rs. The total resistance of the first foam plate 1 given the presence of just one contact point, corresponding to a small contact area, is calculated as 2·Re+Rf1+Rf2+Rf3. In the event of a pressure on both contact points, corresponding to a larger contact area, said total resistance is 2·Re+Rf1+Rf2+Rf3+Rf2/(2·Rs+Rf5/(Rf4+Rf6+2·Re)), and is thus significantly smaller than in the case of just one contact point. By measuring the resistance of the first foam plate 1 across which the voltage drop occurs, it is now possible to make a statement about the contact area, e.g., about a change in the contact area or, after calibration, about an absolute contact area.

A two-dimensional measurement of the contact area is likewise possible, for example by producing a voltage drop in the other direction (e.g., using the further foam plate 2, whose electrodes 4 are arranged rotated through 90° in the (x, y) plane).

According to another specific embodiment, a tactile sensor uses a conductive foam layer S disposed on a circuit board C, such as seen in FIG. 5a. On the side facing the foam material S, the circuit board C has printed on it an interdigital structure I in the form of two intermeshing comb structures. With an increasing force F on the foam material S, an electrical resistance between the two comb structures decreases. FIG. 5b shows, in plan view, the circuit board C with the interdigital structure I and the electrodes E. FIG. 5c shows an equivalent circuit diagram relating to the tactile sensor from FIG. 5a, which comprises a force- or pressure-dependent resistor R.

Figure 6:
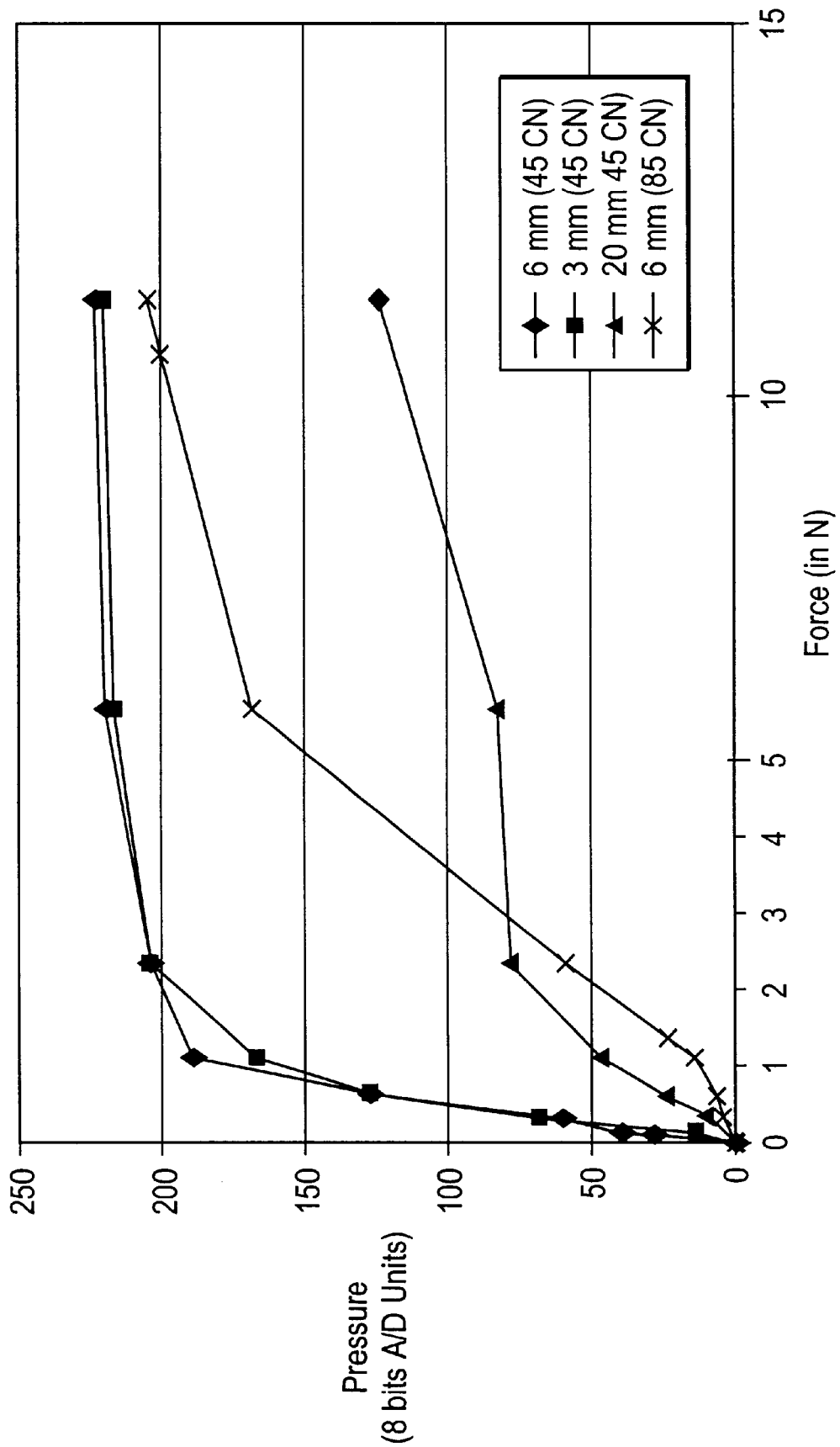
FIG. 6 shows the pressure at the A/D port 6 against the force F loading the tactile sensor T, in accordance with specific embodiments of the present invention.

In accordance with specific embodiments, FIG. 6 shows a sensor signal of a tactile sensor T according to FIG. 1 with foam plates 1, 2 made of Evazote foam in the case of variation in the material properties of the workpieces 1, 2. The thickness (in the z-direction in FIGS. 1 and 3) of the two foam plates 1, 2 (3 mm, 6 mm, 20 mm) is varied, and so is the foam (45 CN and 85 CN, where the number denotes a density and "CN" denotes an electrically conductive design). The analog signal at the A/D port 6 corresponds to a pressure signal is fed into an A/D converter, which converts the analog signal into a digital 8-bit signal in accordance with $2^8=256$ values (="8 bits A/D units"). This 8-bit signal is plotted on the ordinate. The abscissa shows the external force F in N applied to the touch area of the tactile sensor T.

It is evident from the diagram that an approximately identical sensor signal is obtained for foam plates 1, 2 made of Evazote EV 45 CN foam having a thickness of 3 mm (squares) and 6 mm (rhombi), which sensor signal reacts sensitively in a comparatively small force interval F=[≈0; 1] N, and converges toward a saturation value for larger forces F>1 N. For a thickness of 20 mm (triangles), the saturation value is only reached at F≈2.5 N. In the case of Evazote EV 85 CN foam (crosses), the sensitivity is low for small forces F<1 N and, on the other hand, is high for larger forces F>1 N.

In order to cover the force range demonstrated, it would thus be expedient, for example, to have a combination of foam plates of both thicknesses (3 mm or 6 mm together with 20 mm), such as by stacking two tactile sensors T.

Figure 11:
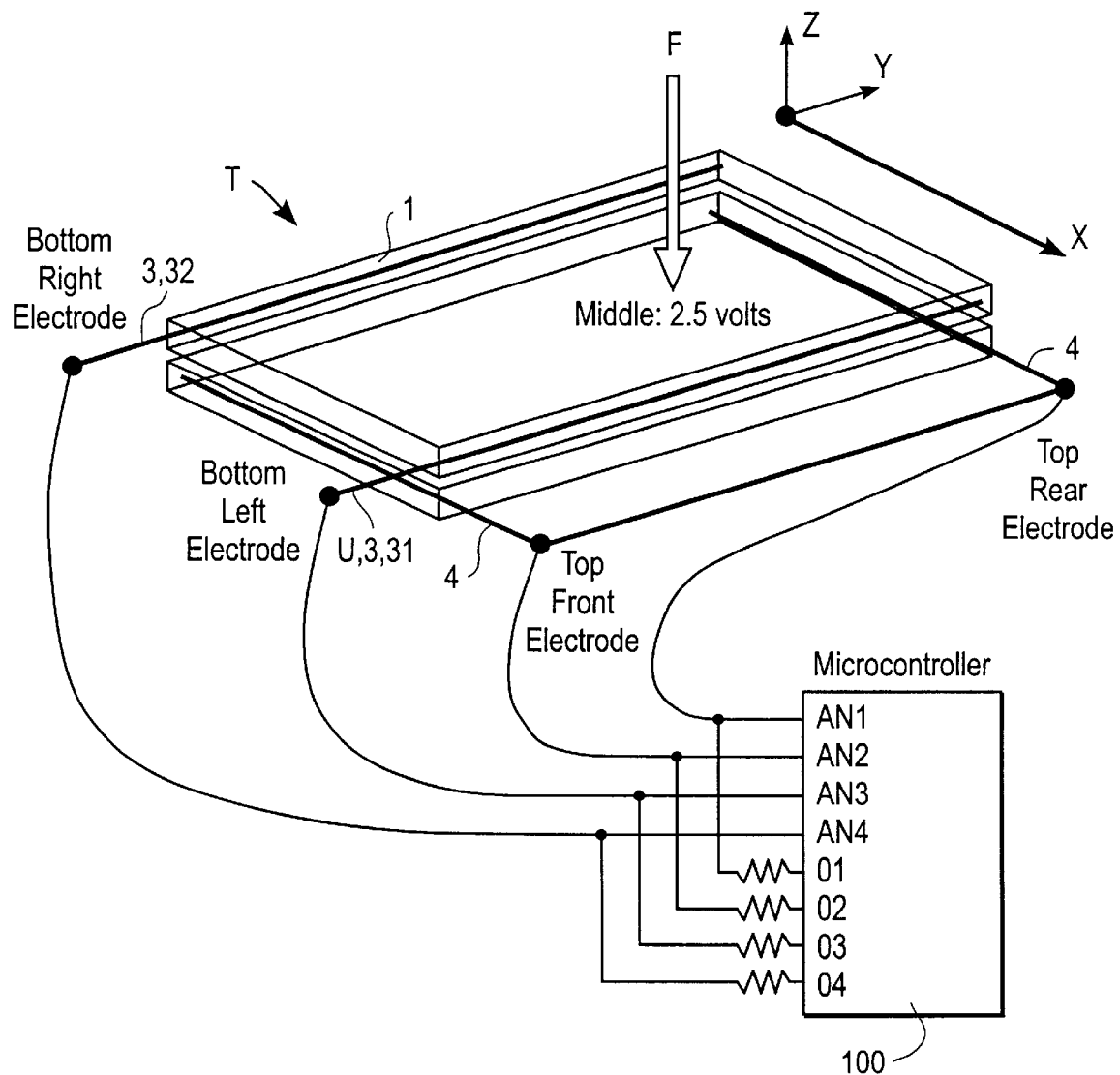
FIG. 11 shows a simplified tactile sensor T of FIG. 1 coupled to a microcontroller for determining various parameters, in accordance with a specific embodiment of the present invention.
Figure 12:
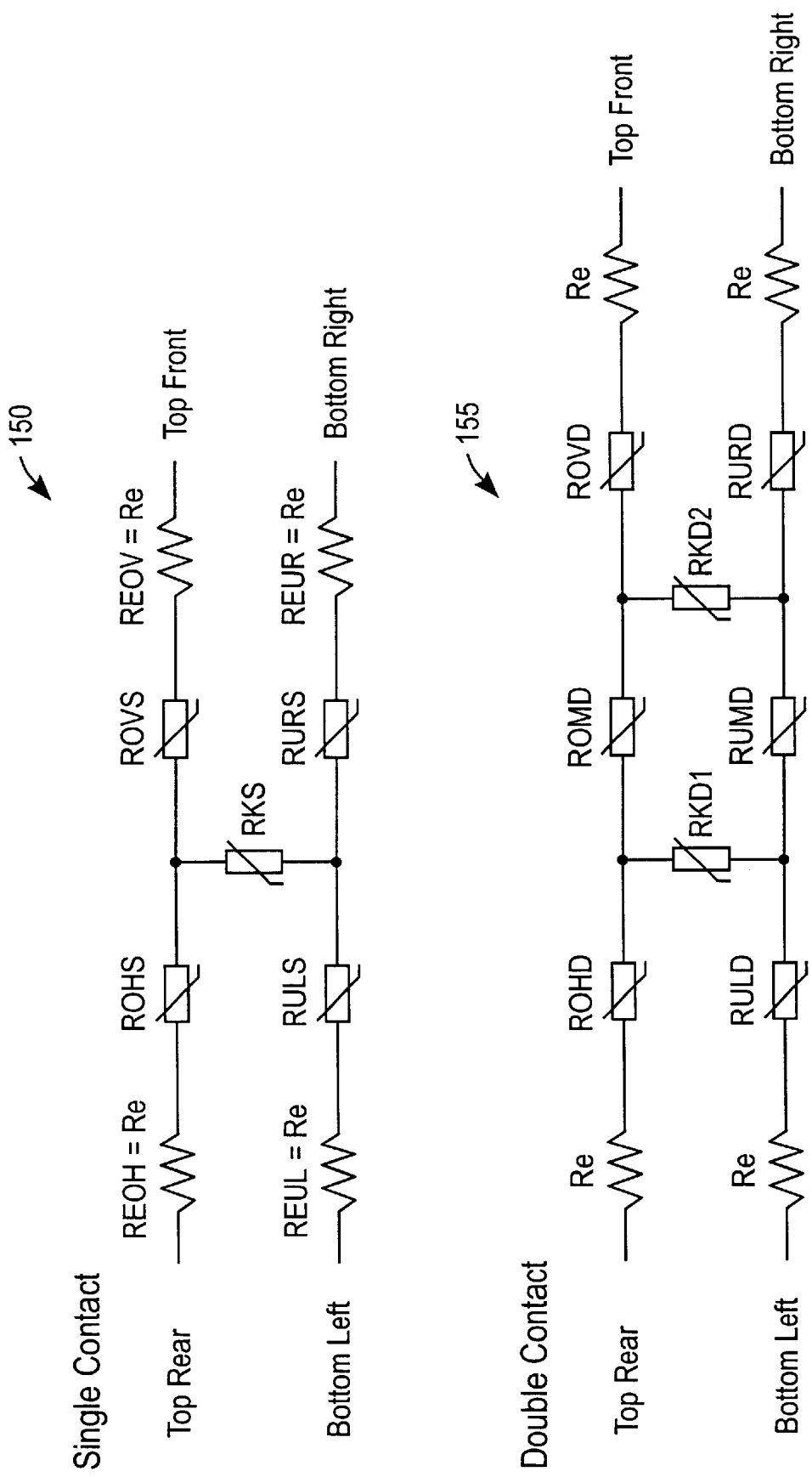
FIG. 12 shows a simplified equivalent circuit diagram of the tactile sensor T useful for determining the various parameters as shown in the configuration of FIG. 11.

As mentioned above, different averaging algorithms of the mentioned position measuring methods and variations thereof can be used, in accordance with specific embodiments of the present invention, to derive further information about the contact shape from the combination of these measurements. FIG. 11 shows a simplified tactile sensor T of FIG. 1 coupled to a microcontroller 100 for determining various parameters as shown in Table 1 below, in accordance with a specific embodiment of the present invention. In addition, FIG. 12 shows a simplified equivalent circuit diagram (150 for a single contact made, 155 for double contact made) of the tactile sensor T useful for determining the various parameters as shown in Table 1 for the configuration of FIG. 11.

As seen in FIG. 11, Table 1 assumes a tactile sensor T having two foam layers each having two electrodes thereon (for example, for rectangular tactile sensor). Each electrode is connected to an electronic driver that can measure the electrode voltage, apply 0 V or 5 V (or other predetermined supply voltage) or high impedance, or apply 0 V or 5 V through a known resistor to the electrode. This is implemented by using two multi-purpose pins of microcontroller 100. Each of these microcontroller pins can either output High or Low or High Impedance. If the port is on high impedance, it can serve as analog input as well. Connecting one of these ports (called port O in the following) through a resistor to the other port (called AN in the following (only this port needs A/D-converter functionality)) and connecting the port AN to the electrode of the sensor results in the necessary electronic circuitry. The numbers of the ports correspond to the electrodes (AN/O1 and AN/O2 are for the upper layer electrodes, AN/O3 and AN/O4 are for the lower layer electrodes). In total, this makes $3^8=6561$ measurements possible, with 0–4 analog measurements being available on each configuration.

The legend to Table 1 is as follows:

A=Analog Input

H=5 V Output

L=0 V Output

Z=High Impedance

X=don't care

O=either H or L

On all measurements the following parameters can be exchanged:

H versus L, left versus right, front versus back, upper layer versus lower layer.

TABLE 1

| | Top Rear | | Top Front | | Bottom Left | | Bottom Right | | |
|---|---|---|---|---|---|---|---|---|---|
| No: | AN1 | O1 | AN2 | O2 | AN3 | O3 | AN4 | O4 | Purpose of Measurement |
| | | | | | | | | | Pressure |
| 1 | H | X | H | X | A | L | A | L | Mean of results represents approx. for pressure |
| 2 | H | X | H | X | A | L | Z | Z | Mean of results 2 & 3 represents approx. for pressure |
| 3 | H | X | H | X | Z | Z | A | L | Mean of results 2 & 3 represents approx. for pressure |
| 4 | H | X | Z | Z | A | L | Z | Z | Measuring of 2*Re + ROHS + RKS + RULS |
| 5 | H | X | Z | Z | Z | Z | A | L | Measuring of 2*Re + ROHS + RKS + RURS |
| 6 | Z | Z | H | X | A | L | Z | Z | Measuring of 2*Re + ROVS + RKS + RULS |
| 7 | Z | Z | H | X | Z | Z | A | L | Measuring of 2*Re + ROVS + RKS + RURS |
| 8 | H | X | A | L | Z | Z | Z | Z | Approximate Measuring of 2*Re + ROHS + ROVS |
| 9 | Z | Z | Z | Z | H | X | A | L | Approximate Measuring of 2*Re + RULS + RURS |

TABLE 1-continued

| | Top Rear | | Top Front | | Bottom Left | | Bottom Right | | |
|---|---|---|---|---|---|---|---|---|---|
| No: | AN1 | O1 | AN2 | O2 | AN3 | O3 | AN4 | O4 | Purpose of Measurement |
| 10 | H | X | Z | Z | A | L | A | Z | like Measurement 4, but second analog input can be used to calculate RULS |
| 11–13 | | | | | | | | | like Measurement 10 but applied to Measurement 5–7 |
| 14 | A | H | A | H | L | X | L | X | Alternative to Measurement 1, but the comparison resistors are now activated at O1 and O2 instead of O3 and O4 |
| 15–27 | | | | | | | | | Alternative to Measurement 2–13. The comparison resistors are now activated at O1 and O2 instead of O3 and O4 |
| 28 | A | H | A | H | A | L | A | L | Alternative to Measurement 1. All comparison resistors are activated. The mean of all analog value changes is a mean for pressure change |
| 29–55 | | | | | | | | | Alternative to Measurement 2–27, with additional activation of comparison resistors at voltage supply (like at 28) |
| 56–111 | | | | | | | | | like Measurement 1–55 but L exchanged with H and vice versa |
| | | | | | | | | | An alternative to measure the pressure is the mathematical combination of measurement 4 to 13 to get RKS. RKS drops with increasing pressure |
| | | | | | | | | | Position Measurements |
| 112 | H | X | L | X | A | Z | A | Z | Mean of analog values results in Front/Back-position |
| 113 | A | Z | A | Z | H | X | L | X | Mean of analog values results in Left/Right-position |
| 114 | A | H | A | L | A | Z | A | Z | The first two analog values give the strength of the current through the foam layers and also gives the maximal values for the position that can be detected through the other analog inputs. The measurement of position is possible. In addition it is possible to measure the contact size (in the front/rear direction). It is also possible to predict if the front left components of a larger area contact is more intense (stronger and larger) than the rear back components (by comparing the values of the electrode voltages 3 and 4) |
| 115 | | | | | | | | | like 114 but for left and right |
| 116–119 | | | | | | | | | like 112 to 115 but H and L exchanged |
| | | | | | | | | | An Alternative to position sensing can be done by taking the results of measurement 4 to 13 and combining them mathematically to get the relation of ROHS to ROVS |

TABLE 1-continued

| | Top Rear | | Top Front | | Bottom Left | | Bottom Right | | |
|---|---|---|---|---|---|---|---|---|---|
| No: | AN1 | O1 | AN2 | O2 | AN3 | O3 | AN4 | O4 | Purpose of Measurement |
| | | | | | | | | | to each other. This relation represents the front/back-position |
| | | | | | | | | | Contact information |
| 120 | H | X | A | L | Z | Z | Z | Z | Measuring the resistance across the front/back electrode foam layer: 2 × Re + ROHD + ROVD +1/ (1/ROMD + 1 /(RKD 1 + RKD 2 + RUMD)). This value decreases with the size of the contact. This value gives information on damage to the sensor or the wiring. |
| 121 | | | | | | | | | like 120 but for left/right |
| 122– 123 | | | | | | | | | like 120 and 121 but exchanged electrodes 1 by 2 and 3 by 4 |
| 124– 127 | | | | | | | | | like 120 to 123 but H changed to L (and of course vice versa) |
| | | | | | | | | | It can be determined if the stronger portions of a larger contact are more to the left or right of the sensed position by comparing measurement 2 to 3 |
| | | | | | | | | | It can be determined if the stronger components of a larger contact are in front or behind the sensed position. To do this measurements analog to 2 and 3 but with exchanged circutry for the electrode layers have to be carried out |
| | | | | | | | | | It can be determined if the contact portions that are further on the right are located in the back or in the front. This can also be used to determine the direction of the angle of a the center axis of a contact with an elongated (for example elliptical) shape. To do this measurement 112 is evaluated. |
| | | | | | | | | | It can be determined if the stronger portions of a contact with an elongated shape are more to the front right or the left rear. To do this evaluate measurement 114 |
| | | | | | | | | | A larger amount of measurements provides information about the contact distribution in the case of distributed contacts or the case of two contacts. A complete list would be too long, so only a few representative examples are given: |
| | A | H | A | Z | A | Z | L | X | The first analog value information with the pressure in the front left corner being less taken into account than pressure in the right rear. By |

TABLE 1-continued

| | Top Rear | | Top Front | | Bottom Left | | Bottom Right | | |
|---|---|---|---|---|---|---|---|---|---|
| No: | AN1 | O1 | AN2 | O2 | AN3 | O3 | AN4 | O4 | Purpose of Measurement |
| | | | | | | | | | comparing this measurement to the three similar ones (with exchanged role of the corners) the contact size and shape can be estimated. The second analog value can be used to determine if the contact was more on the left or right if compared to the measurement with left and right exchanged. The same is true for the third analog value and the front/back contact situation. |
| | H | X | L | X | A | L | Z | Z | This measurement is a variant to measurement 112 where the L on O3 is an irritation of the signal on purpose. The Influence of this irritation on the output signal provides additional information on determining the shape of distributed contacts. There is a variety of similar measurements with the comparison resistors activated or deactivated. Diagnostic Functions |
| | | | | | | | | | Measurement 120 provides information on broken wires, changes, aging and damage to the foam layers. The resistance across the layer will always be in the range characteristic for the selected sensor shape and size if no damage occurred. |
| | A | O | A | O | A | O | A | O | This measurement allows to test the A/D-converters and leakage currents. The sum of the measured currents is zero if the sensor does have no unwanted electrical contact to other parts of the circuit and the AD converters are functioning. |
| | A | Z | A | Z | A | Z | A | Z | This measurement helps detecting capacitively coupled noise. Also signal contents which are purposely coupled capacitively can be detected this way Monitoring Voltage over Time |
| | | | | | | | | | It is also useful to take analog values with high sample rates from the A/D converters. This makes it possible to detect high frequency signals in all measurements. These can be considered as noise. The signal quality can be improved by averaging. Also some of the charging and discharging of the internal capacitance of the sensor can be monitored. |

TABLE 1-continued

| | Top Rear | | Top Front | | Bottom Left | | Bottom Right | | |
|---|---|---|---|---|---|---|---|---|---|
| No: | AN1 | O1 | AN2 | O2 | AN3 | O3 | AN4 | O4 | Purpose of Measurement |
| | | | | | | | | | This offers additional information on the contact shape. It can also be used to compute an estimate of the final settling voltage before the voltage has settled finally. This makes it possible to speed up many of the measurements mentioned above. |

Table 1 is merely an illustration for a specific embodiment of the types of information that can be measured and various parameters accordingly determined. Similar analysis can be provided for other embodiments (such as oddly-shaped tactile sensors that might be used for toys, etc.) besides a rectangular tactile sensor.

In general, it is possible to stack a plurality of tactile sensors having a different sensitivity range. In addition, more than two different foam plates having different material properties (such as density, conductivity, etc.) and/or different thicknesses are possible in order to further increase the sensitivity and extend the measurement range of the tactile sensor apparatus. For the purpose of simpler embodiments, the tactile sensor can comprise a continuous metal area and a conductive elastomer piece. In the case of this arrangement, however, it is not possible to produce a linear voltage drop in a number of directions. Such an arrangement is expedient particularly when a metal area is already present on the apparatus that has to be equipped with the tactile sensor. In such an arrangement, a metal area can also be used simultaneously for a plurality of sensors (without insulation). By way of example, the metal areas may be a vehicle ground.

For more sophisticated embodiments, the elastomer pieces, in particular, can also be used or produced as three-dimensional shaped parts. Thus, in a specific embodiment, each elastomer piece can be sawn from a larger block, for example by means of a cutting wire installation. In this case, by way of example, the at least two elastomer pieces can be produced simultaneously, which reduces the waste from cutting. In another embodiment, each elastomer piece can be welded together from a plurality of plates, as a result of which conductive connections are produced. The tactile sensor may then have, e.g., a rounded or edged form, with the sensor principle also remaining functional over this edge. It goes without saying that such a sensor is not restricted to an angular or edged form. In a further embodiment, each elastomer piece can be introduced into a specially produced mold, e.g., by pouring or foaming. An extremely high degree of freedom in terms of shaping can thus be realized. In another embodiment, the tactile sensor can be bonded together with various other sensors, e.g., a further tactile sensor. Commercially available double-sided adhesive tapes, for example, are suitable for this purpose, and ensure a firm connection. Bonding using a hot-melt adhesive is equally possible, but afterward it is difficult to detach nondestructively. If a plurality of sensors are connected, care should also be taken to ensure that they are electrically insulated from one another. It is also recommended that an electrically insulating plastic layer, e.g., a foam layer, be applied to the surface, which layer may additionally have a decorative or wear-reducing function.

Figure 7A:
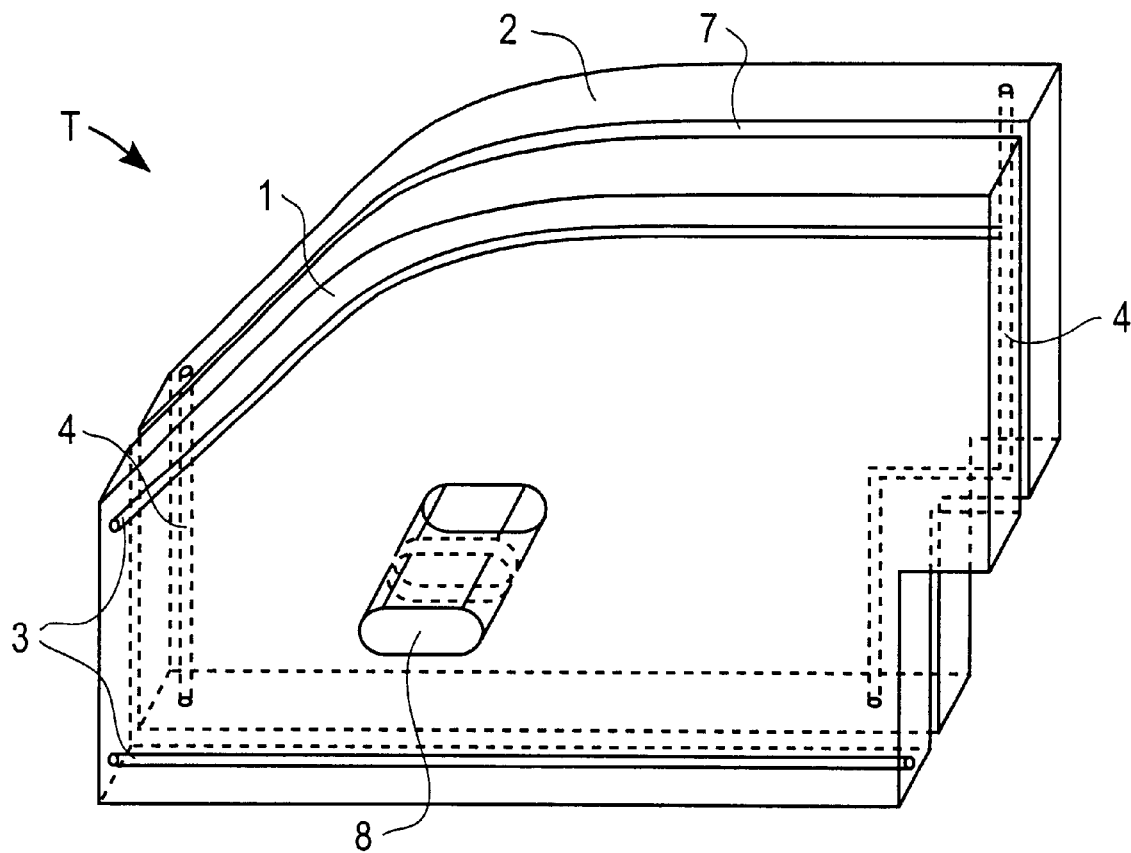
FIGS. 7 to 10 show differently formed embodiments of the tactile sensor T, in accordance with various specific embodiments of the present invention.

In accordance with a specific embodiment, FIG. 7a shows, in an oblique view, a tactile sensor T which can be fitted to a side area of, for example, a cleaning robot. The contour or the tactile sensor T is matched to the area of the application object, namely the cleaning robot. A nonconductive, regularly perforated intermediate layer 7 (e.g., a net or bonding points) is inserted between the two elastomer pieces 1, 2. The detection threshold is increased by the membrane. Tactile sensor T additionally has a cutout 8. Cutouts like this may be needed depending on the specific embodiment (in this case, for example, the cuteout may be used for a recharging connector to a battery of a robot and for "windows" for sonar sensors).

Figure 7B:
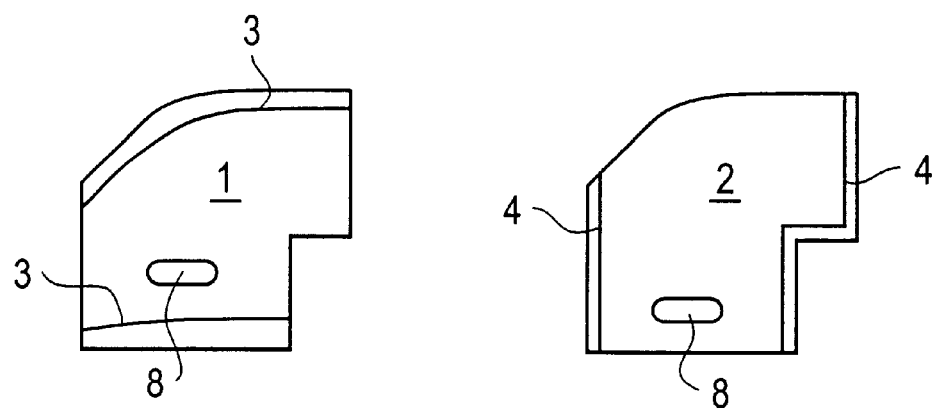

FIG. 7b shows, in side view, the first workpiece 1, (on the left) and the second workpiece 2 (on the right) of the tactile sensor T from FIG. 7a with the corresponding electrodes 3, 4. Since a voltage drop across the side areas of the two workpieces 1, 2 is no longer homogeneous, it may be advantageous to correct the position measurement, e.g., by means of calibration. For embodiments such as a cleaning robot, however, the accuracy of the position measurement is sufficient even without correction.

Figure 8A:
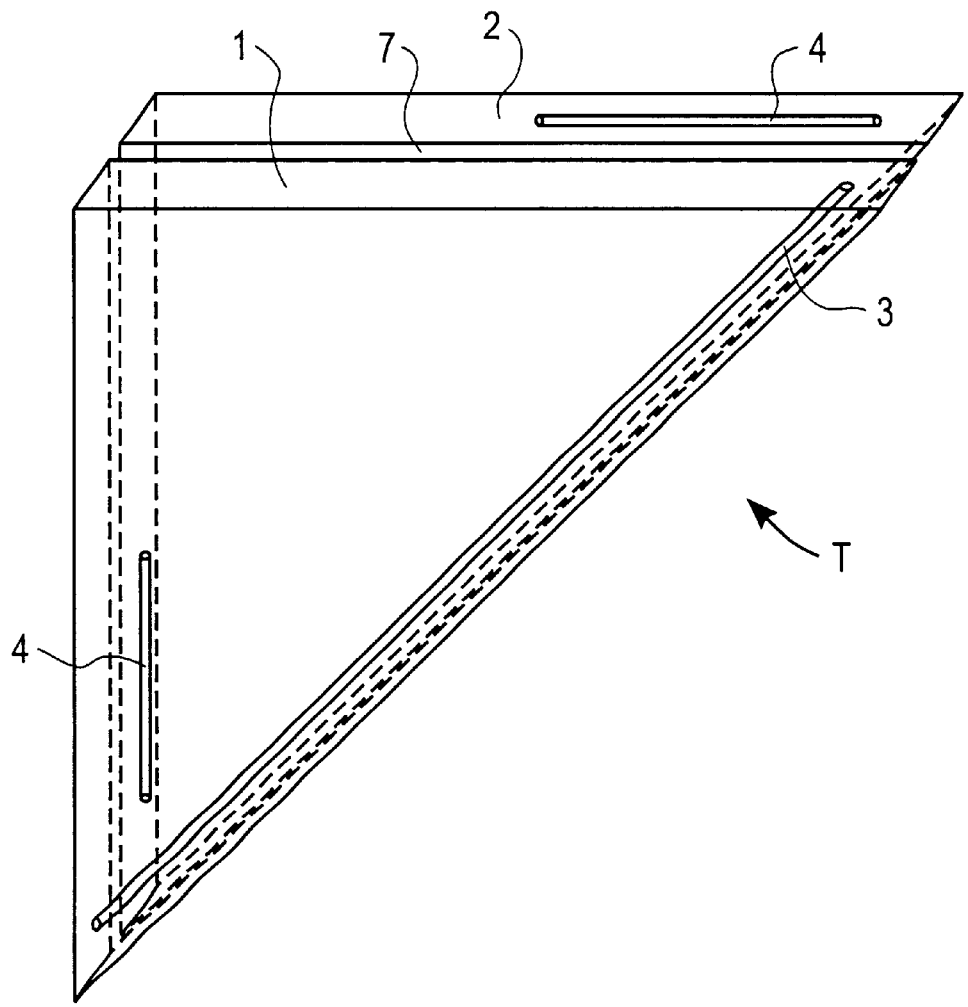
Figure 8B:
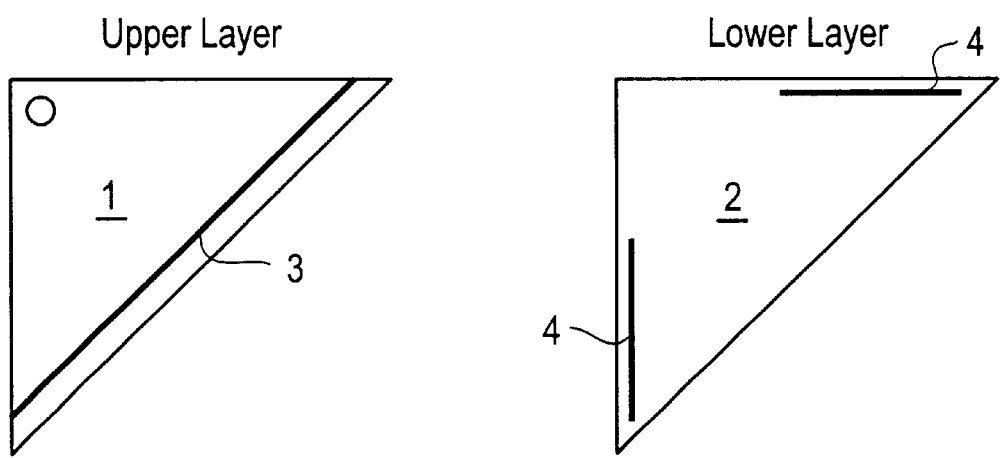

In accordance with another specific embodiment, FIG. 8a shows, in an oblique view, a tactile sensor T with a triangular shape. FIG. 8b shows, in side view, the first workpiece 1 (on the left) and the second workpiece 2 (on the right) of the tactile sensor T from FIG. 8a with the corresponding electrodes 3, 4. It can be seen that the electrodes 4 of the second workpiece 2 do not cover the whole side.

Figure 9:
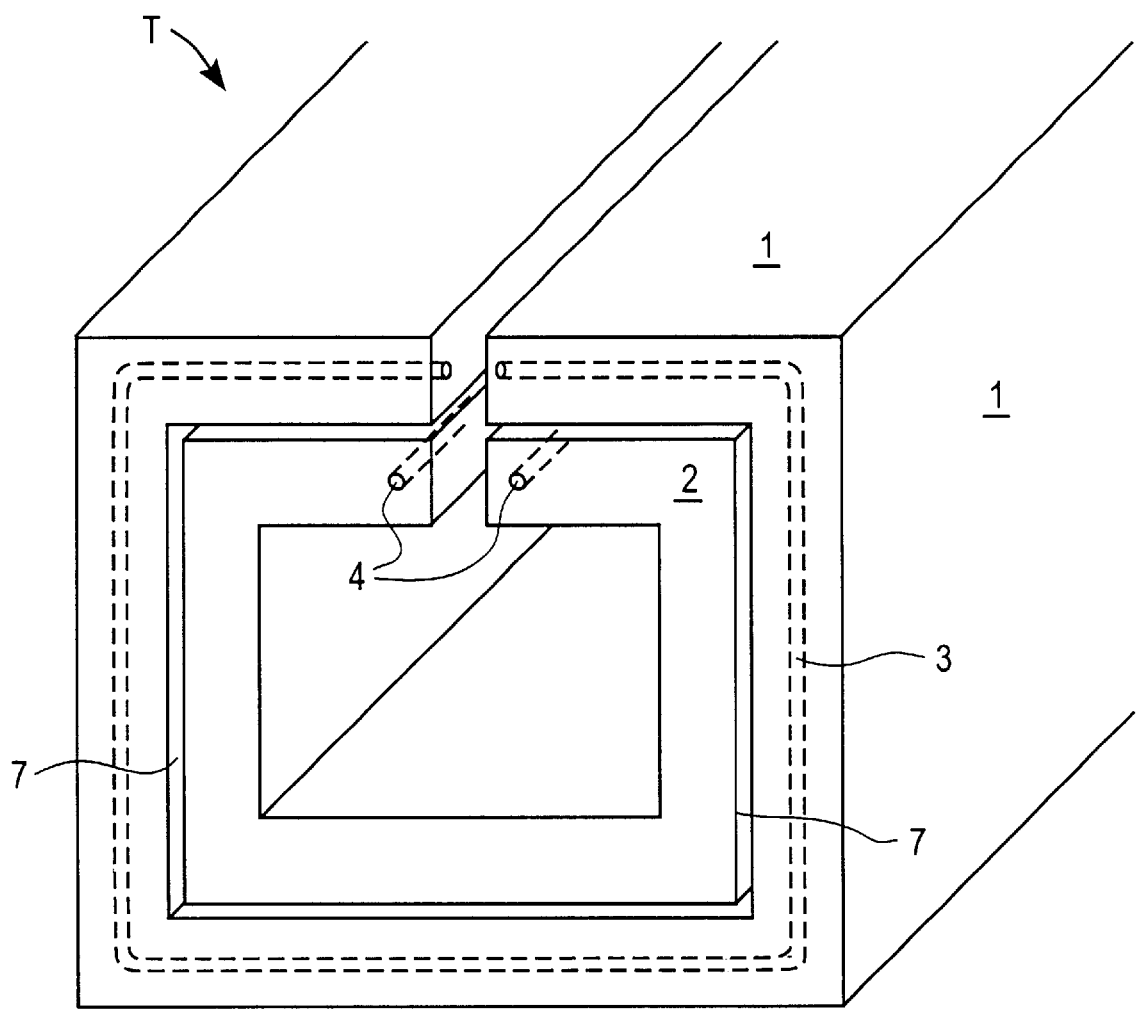

FIG. 9 shows, in an oblique view, an example of a three-dimensionally acting tactile sensor T for enclosing a member such as a robot arm, in accordance with a further specific embodiment. The second electrode 3 of the first, outer workpiece 1 is fitted on the other end area in an analogous manner to the electrode 3 that is illustrated here. The entire perimeter of the arm is thus covered by just one tactile sensor T.

Figure 10A:
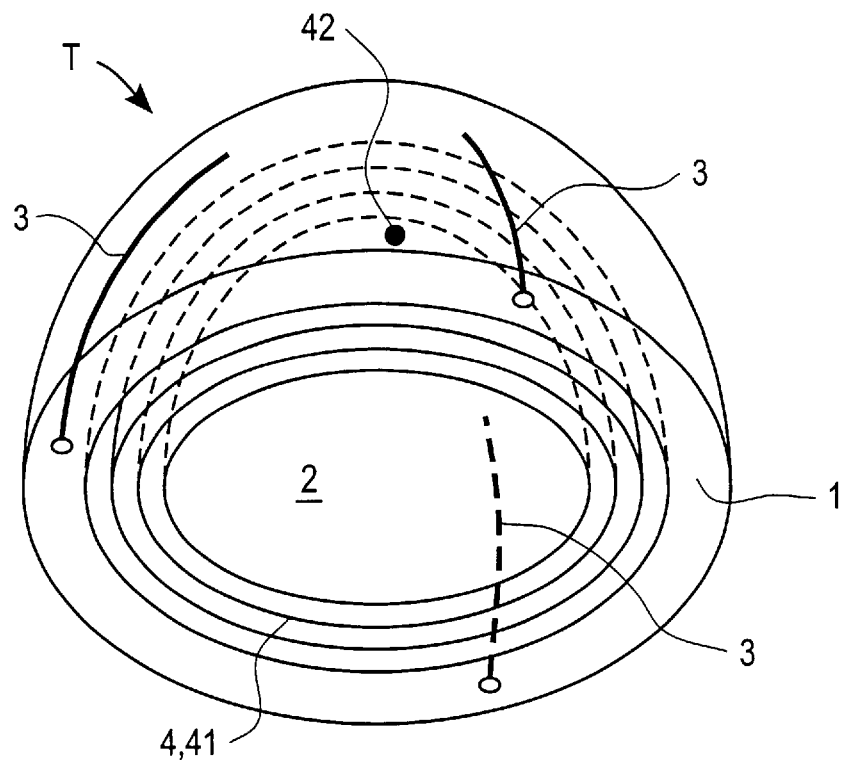
Figure 10B:
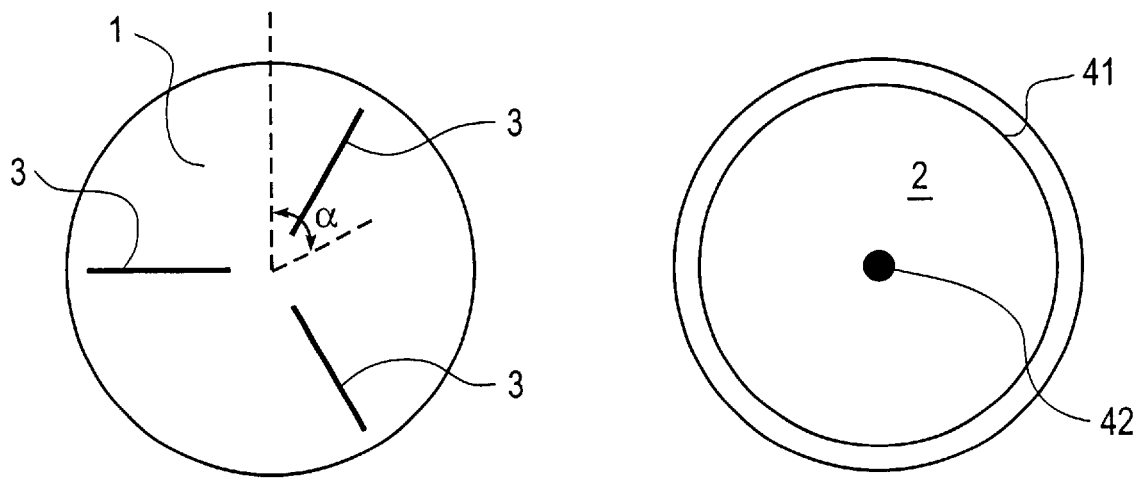

According to another specific embodiment, FIG. 10a shows, in an oblique view, a half shell-shaped tactile sensor T. In order to provide a better illustration, the two workpieces 1, 2 are not bearing on one another. FIG. 10b shows, in plan view, the first, outer workpiece 1 (on the left) and the second, inner workpiece 2 (on the right) of the tactile sensor T from FIG. 10a with the respective electrodes 3, 4. The first workpiece 1 has three electrodes 3 which are arranged rotationally symmetrically. The second workpiece 2 contains an annular electrode 41 and a point electrode 42 in its apex.

This tactile sensor T can be operated in such a way that a voltage difference $\Delta U$ is applied between the electrodes 41, 42 of the second workpiece 2, the intensity of which voltage difference represents the spacing of the spherical apex, the location of the point electrode 42. An angle α between a contact point (designated by "x" here) and a zero mark is determined as the second coordinate. Since an unambiguous result cannot be achieved with the use of just two electrodes 3 in the case of the angle measurement, three electrodes 3 are used in the first workpiece 1. To that end, it can be expedient to connect in each case two of the electrodes 3 to one operating voltage and the third electrode 3 to another operating voltage. After a first measurement, the other operating voltage is assigned to another electrode 3, e.g., by cyclic interchanging, and another measurement is carried out. This increases the accuracy of a determination of the location of the contact point.

As mentioned above, various specific embodiments of the invention using tactile sensors can generally be used to determine touch information. For example, the tactile sensor of the present invention can be used to determine touch information in various contexts, such as for identifying seat occupancy in a motor vehicle; for triggering an airbag; as a sensor for electronic percussion; as an input element for apparatus control; for use in conformable, wearable control devices; for identifying occupancy on conveyor belts; for collision identification on a cleaning robot; or for training assistance for sportsmen and sportswomen and for use in fitness equipment, e.g., for measuring a takeoff point in the high jump, etc.

The tactile sensor of the present invention can also be particularly useful for investigating ergonomics, such as of automobile seats or shoes or office furniture. As an example, deformable foam sensors in accordance with the present invention can be embedded in furniture, such as an office chair, and be configured to provide ergonomic warnings and feedback of incorrect posture or other ergonomically incorrect or harmful positioning to a user of the furniture. As another example, the tactile sensor can also be used to monitor the progress of patients undergoing physical therapy by monitoring how exercises are being performed and moreover to help treat balance problems.

In addition, the tactile sensor of the present invention also can be used to determine touch information for flexible keyboards for use with a computer terminal; a flexible keyboard or keypad for use with a personal digital assistant (PDA) device; or a touchpad for controlling a cursor or other positioning element in a user interface to a computer or other device (as a specific example, a large touch pad could be built into a portable computer carrying bag). For embodiments using keys on a flexible foam sensor device, the number, size and position of the keys thereon may be configurable and remappable. In some embodiments, the tactile sensor may be used as a mousepad that provides an input interface to a computer based on inputs based on a contacting object's (such as a finger) location determined using the tactile sensor.

The tactile sensor of the present invention can further be used for touch and position sensors for toys such as dolls, cars, etc. such that contacts made to specific areas of the touch sensor can be configured to cause particular reactions (e.g., audio or other output, motion initiation, etc.) by the toy. For such applications, sensitivity and resolution might be different across the sensing surface.

In some specific embodiments, such as is the case particularly when the tactile sensor is used to protect a person, safety requirements can be imposed on the tactile sensor. For example, the requirement of identifying a defect may be imposed. Identification of defects can be implemented in a simple manner, as discussed below. Providing information useful for defect identification can be valuable for automated quality control and after-production self tests.

A defect can be identified if there is a break in a connecting line. When such a break exists, an infinite resistance is produced when a voltage is applied within an elastomer piece, where such infinite resistance does not occur during normal operation. Other defects can be identified if there is a short circuit of an electrode connected to a voltage. When such a short circuit exists, voltages which are very near the operating voltages (e.g., the terminal voltages at the electrodes of 0 V and 5 V) do not occur in a normal mode. When there is a short circuit of the electrodes to a value other than an operating voltage (e.g. 0 V and 5V), the defect can be identified in two cases. If the short circuit pulls the measurement signal out of the customary operating range, then this condition can be identified, for example by fuzzy logic. Another possibility is to analyze the frequencies that occur. If a signal change occurs which is too fast for a change in the tactile contact, but can still be perceived by the measurement system, then a defect can be inferred from this.

In accordance with specific embodiment, it may be necessary to reckon with vandalism (e.g. insertion of a blade) where the tactile sensor is used. This must not, however, lead to an unidentified failure of the safety sensor system. Insertion of a blade would, for example, initially (for as long as the blade is inserted) be indicated as an intensive tactile contact (exception: ceramic blade or plastic blade). If the blade is removed, then the sensor resumes its functioning. In this case, however, the entire behavior is changed, which can also be identified by suitable comparison with its normal functioning.

Removal of part of the tactile sensor, for example in the event of vandalism by being torn out or cut out, can also be identified by virtue of the fact that the total resistance of the tactile sensor increases. If the tactile sensor is completely removed from its place, then this cannot be detected if the connecting wires are undamaged. One antidote to this is the possibility of mounting the terminal electrodes in each case on both sides fixedly on a housing of the installation which is equipped with the tactile sensor.

The above description of the various specific embodiments are not intended to unnecessarily limit the scope of the present invention, which is determined only by the metes and bounds of the following claims.

What is claimed:

1. A tactile sensor comprising:
    a first conductive foam elastomer layer having a bottom surface and a top surface;
    a second conductive foam elastomer layer having a bottom surface and a top surface, said top surface of said second conductive foam elastomer layer bearing on said bottom surface of said first conductive foam elastomer layer at a bearing area;
    a first electrode in contact with said top surface of said first conductive foam elastomer layer;
    a second electrode in contact with said bottom surface of said second conductive foam elastomer layer;
    wherein each of said first and second conductive foam elastomer layers have variable surface resistance dependent on pressure placed thereon and wherein it is possible to measure a contact resistance between said first and second conductive foam elastomer layers, said contact resistance being dependent on at least a pressure placed on said bearing area; and
    wherein both conductive foam elastomer layers are shaped to correspond to a two-dimensional area, said area being part of a configurable flexible keyboard to provide an input interface to a computer or other device, said configurable flexible keyboard being flexible due to a flexing nature of said first and second conductive foam elastomer layers.

2. The tactile sensor as claimed in claim 1, in which an intermediate layer is introduced between the first and second conductive foam elastomer layers at edges of said layers.

3. The tactile sensor as claimed in claim 1, wherein said electrodes are made of wire mesh pressed onto the respective conductive foam elastomer layer.

4. The tactile sensor as claimed in claim 1, in which both conductive foam elastomer layers are parallelepipedal, on each of which two electrodes are fitted along opposite side areas of said conductive foam elastomer layers.

5. The tactile sensor as claimed in claim 1, in which said conductive foam elastomer layers comprise EVAZOTE® foam.

6. The tactile sensor as claimed in claim 1, in which said first and said second conductive foam elastomer layers each has a different thickness and/or different material property.

7. The tactile sensor as claimed in claim 1, in which both conductive foam elastomer layers are shaped to correspond to a two-dimensional curvilinear area.

8. A tactile sensor comprising:
   a first conductive foam elastomer layer having a bottom surface and a top surface;
   a second conductive foam elastomer layer having a bottom surface and a top surface, said top surface of said second conductive foam elastomer layer bearing on said bottom surface of said first conductive foam elastomer layer at a bearing area;
   a first electrode in contact with said top surface of said first conductive foam elastomer layer;
   a second electrode in contact with said bottom surface of said second conductive foam elastomer layer;
   wherein each of said first and second conductive foam elastomer layers have variable surface resistance dependent on pressure placed thereon and wherein it is possible to measure a contact resistance between said first and second conductive foam elastomer layers, said contact resistance being dependent on at least a pressure placed on said bearing area; and
   wherein both conductive foam elastomer layers are shaped to correspond to a two-dimensional area, said two-dimensional area being part of said bearing area in a configurable flexible keyboard to provide an input interface to a computer or other device, wherein said configurable flexible keyboard has keys, and the amount of said keys is configurable and remappable, and wherein said configurable flexible keyboard is flexible due to a flexing nature of said first and second conductive foam elastomer layers.

9. A tactile sensor comprising:
   a first conductive foam elastomer layer having a bottom surface and a top surface;
   a second conductive foam elastomer layer having a bottom surface and a top surface, said top surface of said second conductive foam elastomer layer bearing on said bottom surface of said first conductive foam elastomer layer at a bearing area;
   a first electrode in contact with said top surface of said first conductive foam elastomer layer;
   a second electrode in contact with said bottom surface of said second conductive foam elastomer layer;
   wherein each of said first and second conductive foam elastomer layer have variable surface resistance dependent on pressure placed thereon and wherein it is possible to measure a contact resistance between said first and second conductive foam elastomer layers, said contact resistance being dependent on at least a pressure placed on said bearing area; and
   wherein both conductive foam elastomer layers are shaped to correspond to a two-dimensional area, said two-dimensional area being part of said bearing area in a configurable flexible keyboard to provide an input interface to a computer or other device, wherein said flexible keyboard has keys, and the size of said keys is configurable and remappable, and wherein said configurable flexible keyboard is flexible due to a flexing nature of said first and second conductive foam elastomer layers.

10. A tactile sensor comprising:
    a first conductive foam elastomer layer having a bottom surface and a top surface;
    a second conductive foam elastomer layer having a bottom surface and a top surface, said top surface of said second conductive foam elastomer layer bearing on said bottom surface of said first conductive foam elastomer layer at a bearing area;
    a first electrode in contact with said top surface of said first conductive foam elastomer layer;
    a second electrode in contact with said bottom surface of said second conductive foam elastomer layer;
    wherein each of said first and second conductive foam elastomer layers have variable surface resistance dependent on pressure placed thereon and wherein it is possible to measure a contact resistance between said first and second conductive foam elastomer layers, said contact resistance being dependent on at least a pressure placed on said bearing area; and
    wherein both conductive elastomer layers are shaped to correspond to a two-dimensional area, said two-dimensional area being part of said bearing area in a configurable flexible keyboard to provide an input interface to a computer or other device, wherein said flexible keyboard has keys, and the position of said keys is configurable and remappable, wherein said configurable flexible keyboard is flexible due to a flexing nature of said first and second conductive foam elastomer layers.

11. The tactile sensor as claimed in claim 1, in which said other device can comprise a personal digital assistant or a mobile phone or a laptop computer.

12. The tactile sensor as claimed in claim 1, in which said flexible keyboard is built into part of a case for a portable computer.

13. The tactile sensor as claimed in claim 1, in which said flexible keyboard can be configurable to provide said input interface as a mousepad capable of providing input caused by a finger contact.

14. A tactile sensor comprising:
    a first conductive foam elastomer layer having a bottom surface and a top surface;
    a second conductive foam elastomer layer having a bottom surface and a top surface, said top surface of said second conductive foam elastomer layer bearing on said bottom surface of said first conductive foam elastomer layer at a bearing area;
    a first electrode in contact with said top surface of said first conductive foam elastomer layer;

a second electrode in contact with said bottom surface of said second conductive foam elastomer layer;

wherein each of said first and second conductive foam elastomer layers have variable surface resistance dependent on pressure placed thereon and wherein it is possible to measure a contact resistance between said first and second conductive foam elastomer layers, said contact resistance being dependent on at least a pressure placed on said bearing area; and wherein both conductive elastomer layers are shaped to correspond to a two-dimensional area, said two-dimensional area being part of said bearing area in a flexible keyboard, wherein said flexible keyboard is flexible due to a flexing nature of said first and second conductive foam elastomer layers.

* * * * *